Patented Nov. 9, 1926.

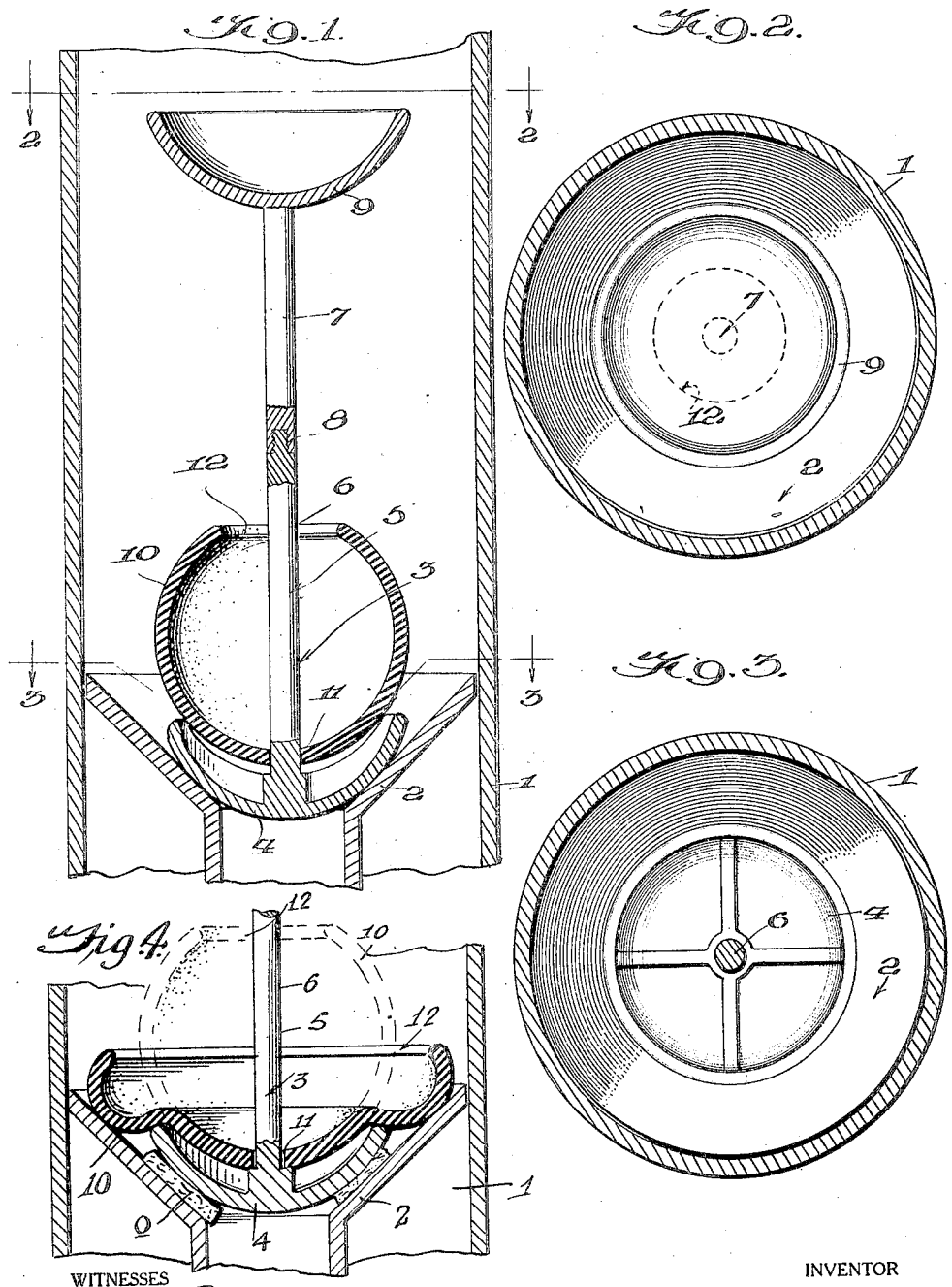

UNITED STATES PATENT OFFICE.

ALEXANDER BOYNTON, OF SAN ANTONIO, TEXAS.

WELL-CEMENTING DEVICE.

Application filed December 21, 1925. Serial No. 76,842.

This invention relates in general to a cementing device especially designed for use in carrying out the methods forming the subject-matter of my co-pending applications, filed October 1, 1925, Serial Numbers 59,887 and 59,888 and more particularly the present invention relates to an improvement in valve assemblies used in such cementing devices. The present invention aims to provide a novel form of valve device of this character which is designed for co-operation with a single valve seat in the well casing in such manner as to insure a proper seal of the opening which said valve seat surrounds under all circumstances thereby preventing the further flow of cement at the proper time and also causing the pump to stall to advise the operator that the cementation has been completed.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a view partly in section and partly in elevation showing one embodiment of the invention, Figure 2 is a sectional view on the line 2—2 of Figure 1, Figure 3 is a similar view on the line 3—3 of Figure 1, and Figure 4 is a fragmentary view in section showing how the particular form of sealing member shown is expanded and deformed to stop the flow of liquid in the event of the failure of the main valve seat.

Referring to the drawings, the numeral 1 designates a cementing device of the type forming the subject-matter of my co-pending application executed under even date with this application and identified as Case Number 1. In the present invention, however, only one valve seat 2 is employed. A valve assembly, designated generally at 3, is provided and includes a main fixed valve 4 having the form of a cup and integral with or otherwise rigidly connected to the lower end of a valve stem 5. The valve stem 5 is made up of a lower section 6 and an upper section 7 having a joint 8 connecting the same. The upper section 7 has a cup-shaped head or member 9 fixed thereto and which serves as a guide in that it tends to hold the valve assembly in substantially vertical position in the well casing. Moreover, this cup-shaped member presents a surface which re-acts to the pressure in that downward flow of fluid in the well casing tends to carry the member 9 with it. This tends to seat the main valve on the seat 2. Again, if the specific gravity of the valve assembly as a whole be approximately equal to or somewhat lighter than that of the mud fluid (through error) the resistance which the cup-shaped member 9 presents to upward movement of the valve assembly would be effective to prevent the valve assembly from rising in the mud fluid. A rubber sealing member 10 is mounted on the lower section 6 of the stem 5 and normally rests on the main valve 4. This sealing member is made of readily expansible rubber or other highly elastic substance and is in the form of a hollow sphere having an opening 11 accommodating the stem and an upwardly presented opening 12 affording communication between the fluid and the cementing device and its interior. The entire assembly is of such specific gravity that it is heavier than the mud fluid but lighter than the liquid cement.

In use the valve assembly is placed on top of the cement and in accordance with the method and when the cement has practically all been pumped down through the cementing device the main valve member 4 will strike the seat 2. If the main valve member 4 properly engages the seat 2 the further flow of cement is prevented and the pump stalls. Should an obstruction prevent the proper seating of the valve or should such seating be prevented in any other way the down flow of the mud fluid would result in an expansion of the sealing member 10 causing it to lap over the valve in its seat and effect the desired sealing action.

Figure 4 of the drawing illustrates obstructions O preventing the proper seating of the main valve member 4 and also shows how the auxiliary sealing member or auxiliary valve 10 is expanded and deformed to provide the requisite sealing action.

I claim:—

1. In a cementing device for use with well casings having a valve seat therein adjacent the point of discharge of the cement, a valve assembly having a specific gravity greater than the liquid cement and less than the mud fluid and comprising a main valve cooperable with the seat, and an expansible sealing member located adjacent the main valve and designed to be expanded by a flow of the fluid which follows the failure of the seating of the main valve.

2. In a cementing device for use with well casings having a valve seat therein adjacent the point of discharge of the cement, a valve assembly having a specific gravity greater than the liquid cement and less than the mud fluid and comprising a main valve co-operable with the seat, and an expansible sealing member located adjacent the main valve and designed to be expanded by a flow of the fluid which follows the failure of the seating of the main valve, said sealing member consisting of a hollow body of elastic material having an upwardly presented opening.

3. In a cementing device for use with well casings having a valve seat adjacent the point of discharge of the cement, a valve assembly having a specific gravity less than the liquid cement and greater than the mud fluid and comprising a main valve co-operable with the valve stem, a stem connected at its lower end to said main valve, a guide at the upper end of the stem, and a hollow sealing member mounted on the stem and resting on the main valve and having an upwardly presented opening whereby it is designed to be expanded by the flow which follows the failure of the main valve to seat.

4. In a cementing device for use with well casings having a valve seat adjacent the point of discharge of the cement, a valve assembly having a specific gravity less than the liquid cement and greater than the mud fluid and comprising a main valve co-operable with the valve stem, a seat connected at its lower end to said main valve, a substantially cup-shaped member connected to the upper end of the stem, and a hollow sealing member mounted on the stem and resting on the main valve and designed to be expanded by the flow which follows the failure of the main valve to seat.

5. In a cementing device for use with well casings having a valve seat adjacent the point of discharge of the cement, a valve assembly comprising a main valve co-operable with the valve seat and an auxiliary valve member associated with the main valve and comprising a hollow deformable body having an opening affording communication between the interior of the casing and the interior of the hollow body whereby the hollow body is deformed and brought into sealing contact with the valve seat on the main valve when the main valve fails to seat properly.

ALEXANDER BOYNTON.